United States Patent

Chimitt

(10) Patent No.: US 7,583,608 B2
(45) Date of Patent: Sep. 1, 2009

(54) LINK ADAPTION BASED MMSE EQUALIZATION ELIMINATES NOISE POWER ESTIMATION

(75) Inventor: William Chimitt, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 10/977,004

(22) Filed: Oct. 27, 2004

(65) Prior Publication Data

US 2006/0088006 A1    Apr. 27, 2006

(51) Int. Cl.
*H04L 1/00*        (2006.01)
*H04J 3/16*        (2006.01)

(52) U.S. Cl. .................................. 370/252; 370/465

(58) Field of Classification Search .................. 370/252, 370/465, 332, 232; 455/67.13; 375/229, 375/232

See application file for complete search history.

(56) References Cited

U.S. PATENT DOCUMENTS

| | | | |
|---|---|---|---|
| 6,175,588 B1 * | 1/2001 | Visotsky et al. ............. | 375/148 |
| 6,549,520 B1 * | 4/2003 | Gross et al. .................. | 370/242 |
| 2002/0154688 A1 * | 10/2002 | Pollmann et al. ............ | 375/229 |
| 2005/0129105 A1 * | 6/2005 | Papasakellariou ........... | 375/232 |
| 2006/0087972 A1 * | 4/2006 | Jalali et al. .................. | 370/232 |
| 2007/0242737 A1 * | 10/2007 | Tzannes ..................... | 375/222 |

* cited by examiner

*Primary Examiner*—Barry W Taylor
(74) *Attorney, Agent, or Firm*—Scott M. Lane; Intel Corporation

(57) ABSTRACT

Coefficients for an Minimum Mean Square Error (MMSE) equalizer may be generated without the receiver performing noise power estimation. The noise power may be inferred from knowledge of the Modulation and Coding Scheme (MCS) that is selected by the link adaptation system. The link adaptation system dynamically converges to a data rate, and that data rate implies an Signal-to-Noise Ratio (SNR) range within which the communication device operates. Using the SNR range, an upper end of the range is selected and used as an SNR value for the MMSE equalizer calculations.

9 Claims, 5 Drawing Sheets

LINK ADAPTION BASED MMSE EQUALIZATION ELIMINATES NOISE POWER ESTIMATION

In wireline systems and cellular communication systems the quality of a signal received by a device depends on a number of factors. These factors may include the distance between the desired and interfering base stations, path loss, fading and noise. To improve system capacity, the signal transmitted to and by a particular user may be modified to account for signal quality variations. Further system capacity improvements are needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
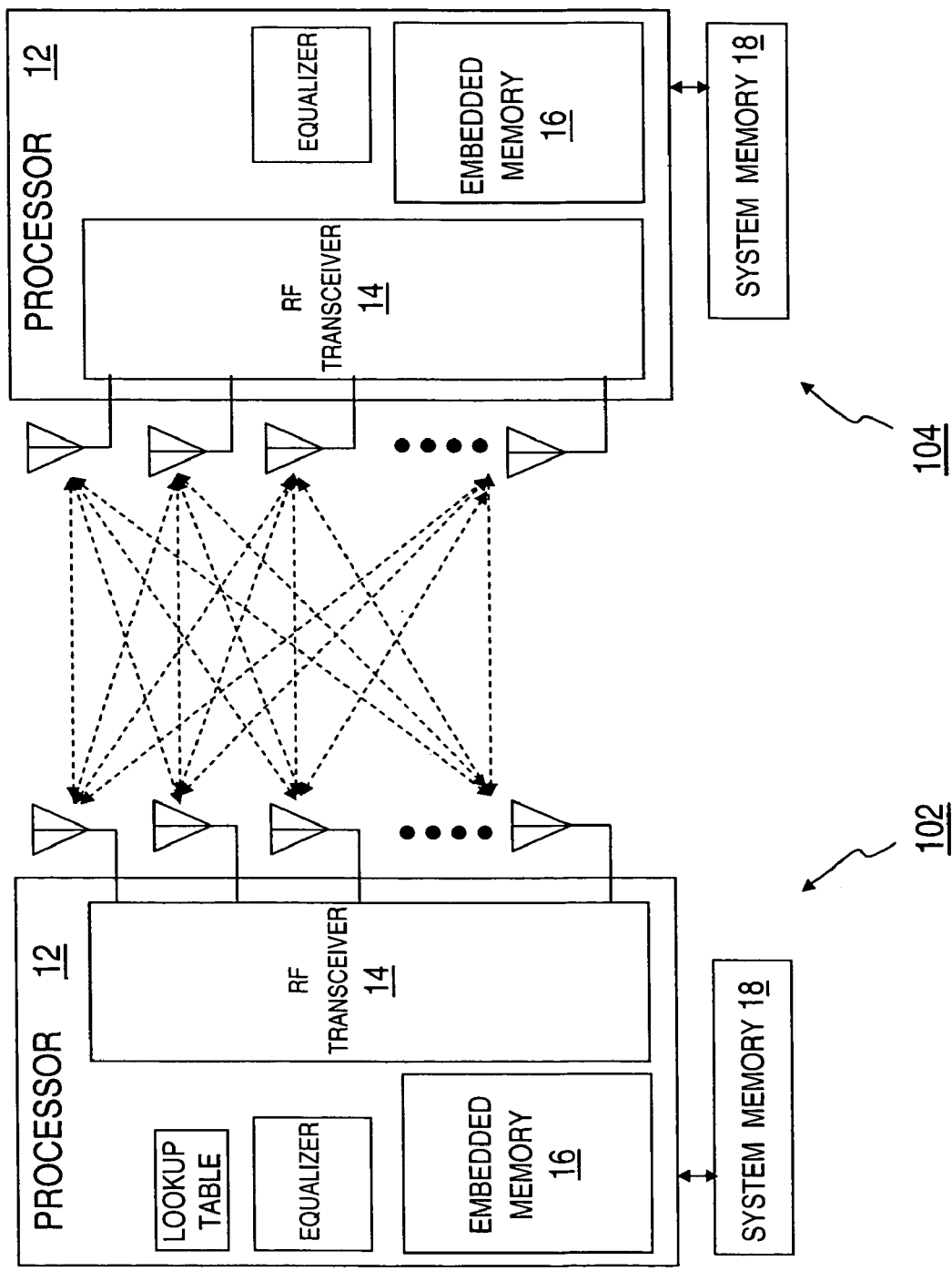
FIG. 1 illustrates wireless communications devices that may incorporate features of the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

FIG. 1 illustrates features of the present invention that may be incorporated, for example, into wireless communications devices 102 and/or 104. In the wireless communications embodiment, a transceiver 14 both receives and transmits a modulated signal from one or more antennas. The analog front end transceiver may be a stand-alone Radio Frequency (RF) integrated analog circuit, or alternatively, be embedded with a processor 12 as a mixed-mode integrated circuit. The received modulated signal may be frequency down-converted, filtered, then converted to a baseband, digital signal.

Processor 12 may include baseband and applications processing functions, and in general, be capable of fetching instructions, generating decodes, finding operands, performing the appropriate actions and storing results. The digital data processed by processor 12 may be stored internally in an embedded memory 16 or transferred across an interface for storage by a system memory 18. System memory 18 may include a variety or combination of memories such as volatile memories and/or nonvolatile memories.

The embodiment showing the two wireless stations is described in the context of a frequency domain equalizer (FEQ) designed to separate multiple spatial channels in OFDM signaling. If the impulse response of all the spatial channels is shorter than the cyclic extension then no time domain equalizer (TEQ) is required. However, an MMSE FEQ may be used to separate the spatial streams. In 802.11N the channel is wireless and may change quickly, and the packet based protocol favors a one time calculation of the equalizer coefficients over a convergent approach.

Such an equalizer is implemented for each sub-carrier in the OFDM system. However, it should be noted that features of the present invention may be applied to any communication standard for which a receiver implementation may employ an MMSE equalizer. As such, the MMSE equalizer may be a time domain equalizer for single carrier signaling; a frequency domain equalizer designed to separate multiple spatial channels in OFDM signaling; or any hybrid thereof.

Embodiments of the present invention provide a variety of applications in smart phones, communicators and Personal Digital Assistants (PDAs), medical or biotech equipment, automotive safety and protective equipment, and automotive infotainment products. However, it should be understood that the scope of the present invention is not limited to these examples. The most viable applications are in the area of wireless communications since they have fast changing channels that favor packet based protocols and a one-time calculation of equalizer coefficients rather than converging algorithms. Cable modems, voice band modems and Digital Subscriber Line (DSL) applications may benefit from this invention.

Discrete Multi-tone Data Transmission (DMT) applications in DSL or cable modem standards may employ bundles of wires into a receiver with each wire carrying a DMT signal. The cross talk from one wire to the next is very similar to the cross channels in a wireless application and an MMSE FEQ may be used to separate the channels. The present invention may be used to initialize the coefficients and speed convergence.

In some embodiments, devices 102 and 104 may operate partially in compliance with, or completely in compliance with, a wireless network standard. For example, devices 102 and 104 may operate partially in compliance with a standard such as ANSI/IEEE Std. 802.11,1999 Edition, although this is not a limitation of the present invention. As used herein, the term "802.11" refers to any past, present, or future IEEE 802.11 standard, including, but not limited to, the 1999 edition. Also for example, devices 102 and 104 may operate partially in compliance with any other standard, such as 802.15 or 802.16, or any future IEEE personal area network standard or wide area network standard.

Devices 102 and 104 each include a number "r" of antennas, where "r" may be any integer number. By way of example, devices 102 and 104 may communicate with each other using a single input, a single output and non-Orthogonal Frequency Division Multiplexing (OFDM) signaling techniques. But note that the various embodiments of the invention are not so limited, and devices 102 and 104 may communicate using Multiple-Input-Multiple-Output (MIMO) and OFDM in each spatial channel and use multiple antenna configurations. As shown in the figure, devices 102 and 104 may employ multiple transmit and receive antennas, and antenna configurations such as 2×2, 4×2, 4×4 and beyond are anticipated. Further, devices 102 and 104 may have an equal number or an unequal number of antennas.

Devices 102 and 104 may operate in an environment with many "reflectors" (e.g. walls, doors, or other obstructions). This "multipath" environment allows many signals to arrive from different paths, and thus, each "channel" through which devices 102 and 104 communicate may include many possible signal paths. In some embodiments, devices 102 and 104 utilize multiple antennas to take advantage of the multipath and to increase the communications bandwidth. For example, in some embodiments, devices 102 and 104 may communicate using MIMO techniques. In general, MIMO systems offer higher capacities by utilizing multiple spatial channels made possible by multipath. MIMO systems may operate "open loop" where a station estimates the state of a channel without receiving channel state information directly from another station.

Figure 2:
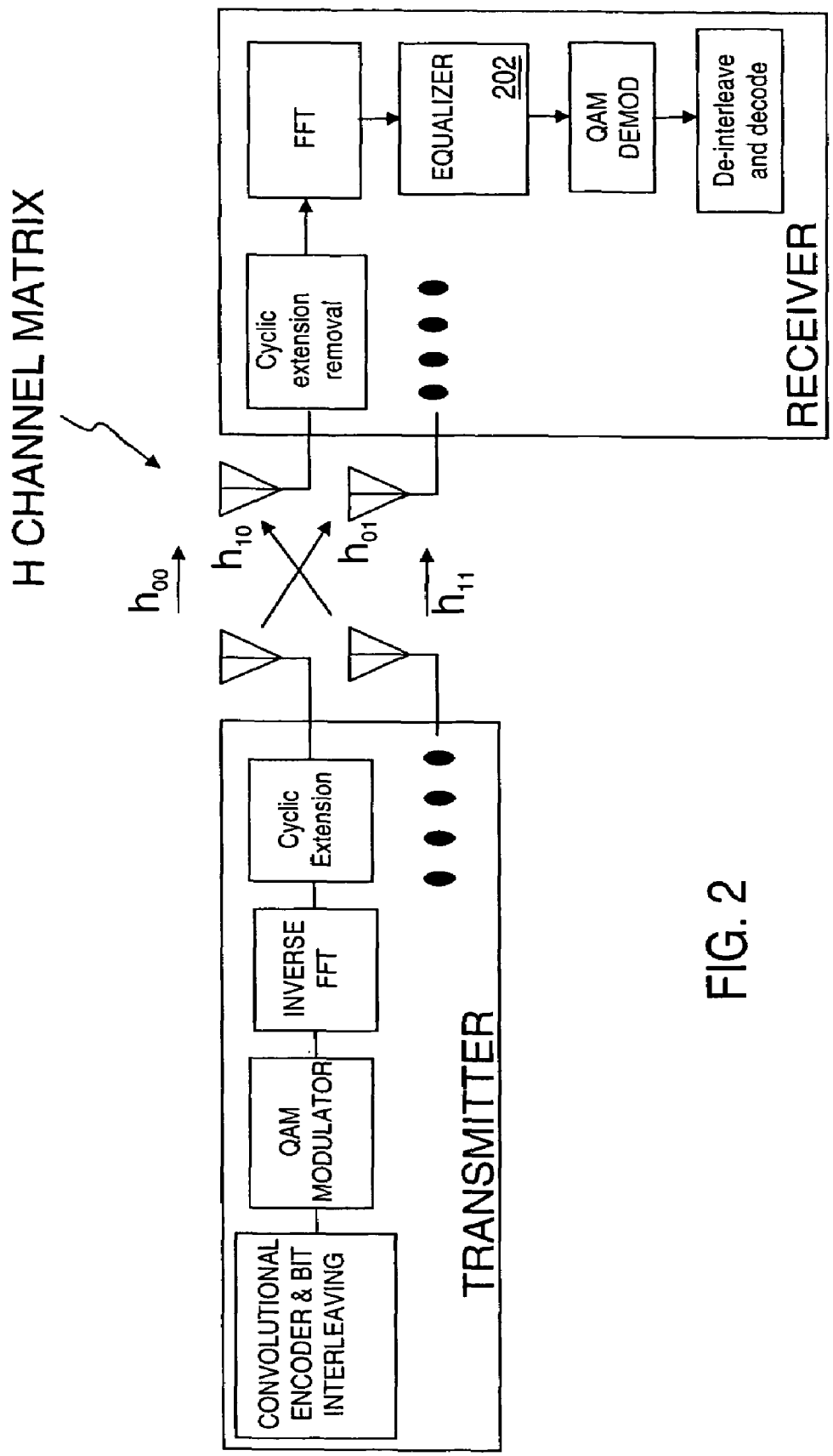
FIG. 2 illustrates a communication system that employs a linear equalizer in accordance with the present invention.

FIG. 2 illustrates a communication system that employs decoding complexity that includes a linear equalizer 202 such as Minimum Mean Square Error (MMSE) equalizer and a Zero Forcing (ZF) equalizer to estimate the channels. Again, the embodiments for the present invention in a communication system may, in general, include a MIMO system, an OFDM system, a DMT system or a non-OFDM system.

Consider an example of an OFDM MIMO transmission from a transmitter using t transmit antennas to a receiver using r receive antennas. Assume, for example, that the transmitted signal from each antenna is the IFFT of a set of sub-carriers, modulated in the frequency domain. At the receiver, an FFT separates the sub-carriers. After sub-carrier separation, the receiver observes the combined transmissions from each of the t transmit antennas. In this example, the transmitters may interfere with each other within each sub-carrier and it is the equalizer that separates the spatial streams (transmissions from each transmit antenna).

On a particular sub-carrier, the receiver observes $$y = Hx + n,$$

where y denotes a r×1 vector whose elements represent the received signal for the sub-carrier at each antenna (the vector y is observed after the FFT's are performed on the input from each antenna to isolate the sub-carrier energy);

H denotes the r×t channel matrix where r is the number of receive antennas and t is the number of transmit antennas; and x denotes the t×1 vector of transmitted constellation points on that sub-carrier, one for each transmit antenna.

The equalizer transforms received vector y into the transmit vector x. The equalizer coefficient matrix W is t×r. The transmitted constellation points x are recovered using the following equation:

$$x = Wy.$$

The linear equalizer 202 coefficients for the Zero Forcing equalizer may be given by equation (1), as follows:

$$w = H^{-1}, \text{ if the number of transmitters and receivers are equal, but more generally given as } w = (H^*H)^{-1}H^*, \quad (1)$$

where H denotes the r×t channel matrix where r is the number of receive antennas and t is the number of transmit antennas; and H* denotes the conjugate transpose of the channel matrix.

The equalizer coefficients for the MMSE equalizer may be given by equation (2), as follows:

$$w = \left(H^*H + \frac{1}{SNR}I\right)^{-1} H^*, \quad (2)$$

where H again denotes the r×t channel matrix where r is the number of receive antennas and t is the number of transmit antennas;

H* denotes the t×r conjugate transpose of the channel matrix;

SNR is the Signal-to-Noise Ratio; and

I is the t×t identity matrix.

Note from equations (1) and (2) that a MMSE equalizer, in contrast to a Zero Forcing equalizer, requires an estimate of the SNR for each sub-carrier in order to properly initialize equalizer 202 and calculate soft bit metrics. In fact, many equalizers must be initialized with the proper coefficients or weights, one for each sub-carrier in an OFDM system. But the drawback to using the MMSE equalizer is that accurate SNR estimations require additional complexity in the receiver in order to provide the noise estimates. However, in accordance with the present invention, the MMSE equalizer coefficients may be initialized and soft bit metrics calculated without expressly performing the noise estimations.

In order to provide initial coefficients to the MMSE equalizer without the receiver performing the noise estimates, the present algorithm observes the transmission rate selected by the link adaptation system. For example, the link adaptation system in transceiver 14 for a packet-based network dynamically converges to a data rate, and that data rate implies an SNR range within which the wireless communications devices 102 and 104 operate. An SNR from within this range will be used to calculate the MMSE equalizer coefficients.

The present algorithm also takes advantage of a relationship between SNR estimation error and performance. Degradation due to SNR estimation error is bound when SNR is estimated high. For example, should the SNR be estimated to be infinite, the performance would exactly match the performance of the zero forcing equalizer and no worse. On the other hand, if SNR were estimated too low, performance could be significantly worse than it would be with a Zero Forcing equalizer. Therefore, an SNR is selected from the upper end of the SNR range indicated by the link adaptation system to avoid the possibility of gross under-estimation that would result in performance below that of the ZF equalizer.

Figure 3:
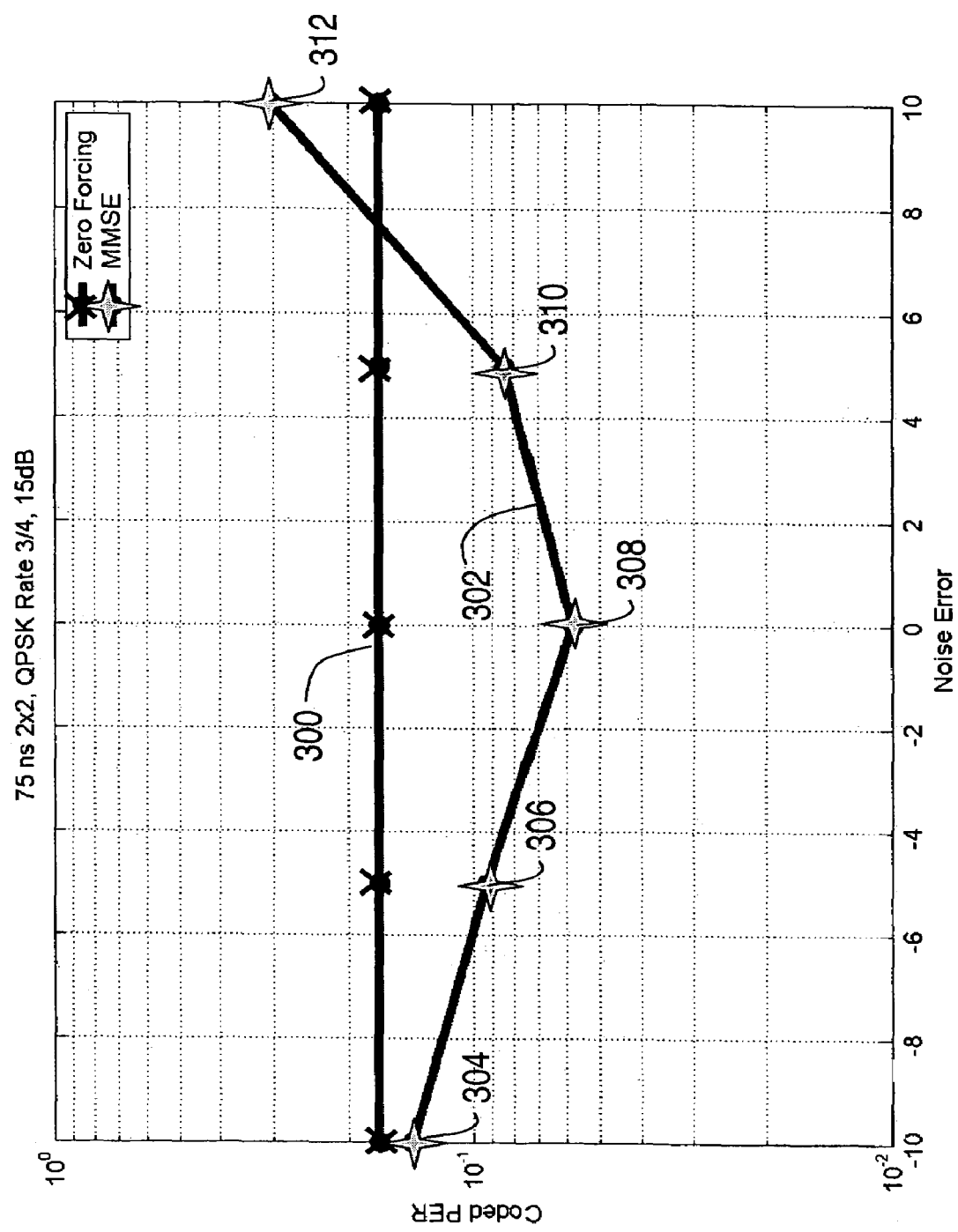
FIG. 3 is a plot of Packet Error Rate (PER) versus noise error in dB.

FIG. 3 is a plot of Packet Error Rate (PER) versus noise error in dB. Note that over estimating the noise is equivalent to underestimating the SNR, and therefore, large positive noise estimation errors are undesirable. In this example, a 36 Mbps, 2×2 MIMO link with 15 dB of SNR is present. Waveform 300 is the PER for a Zero Forcing equalizer and waveform 302 is the PER for an MMSE equalizer assuming different SNR values. For instance, point 304 on waveform 302 corresponds to under-estimating the noise by 10 dB (or over-estimating the SNR); point 306 corresponds to under-estimating the noise by 5 dB; point 308 corresponds to a perfect noise/SNR estimate; point 310 corresponds to over-estimating the noise by 5 dB; and point 312 corresponds to over-estimating the noise by 10 dB (or under-estimating the SNR). Note from the figure that as long as the noise is not significantly over estimated, the MMSE equalizer provides a lower PER than the Zero Forcing equalizer. This is reflected in equation (2) by the 1/SNR I term, noting that if the noise power estimate approaches zero (SNR becomes very large) then in the limit the MMSE equalizer converges to a Zero Forcing equalizer. On the other hand, over-estimating the noise, i.e., under-estimating SNR, causes the 1/SNR I term to become significant.

The figure shows that a receiver using the MMSE equalizer and the MMSE equalizer coefficients determined by the present algorithm may out-perform the Zero Forcing equalizer. Put another way, the SNR calculations based on low noise power estimates produce an MMSE equalizer that out performs a Zero Forcing equalizer. Note that a large, low-side error can be tolerated without giving up substantial performance, but the same is not true if the noise power is over-estimated.

Figure 4:
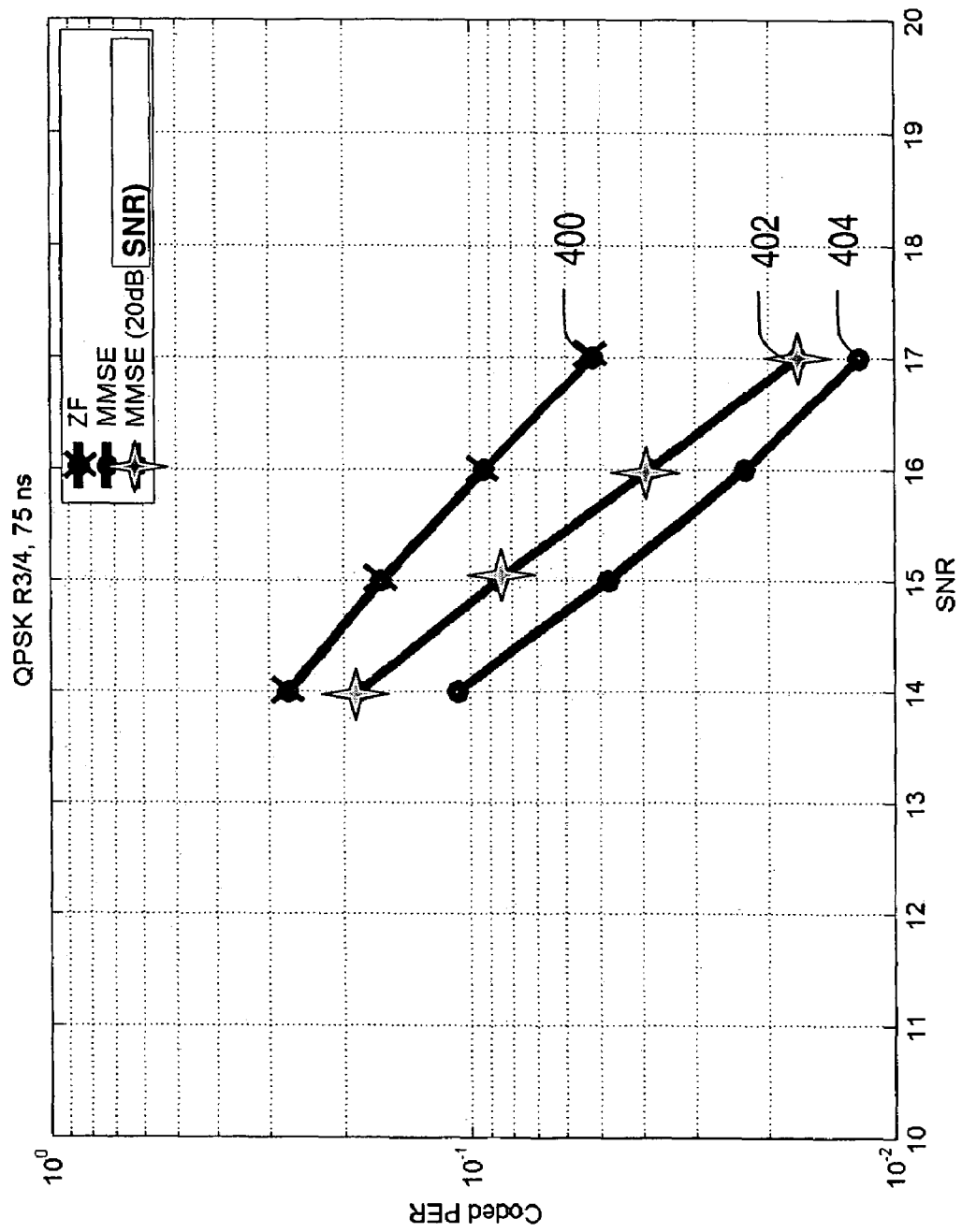
FIG. 4 is a plot of Packet Error Rate versus Signal-to-Noise Ratio (SNR), comparing results from a Zero Forcing (ZF) equalizer with an Minimum Mean Square Error (MMSE) equalizer with knowledge of the SNR and an MMSE equalizer that assumes 20 dB SNR.

FIG. 4 is a plot of Packet Error Rate (PER) versus SNR. The figure compares results of waveform 400 for a Zero Forcing equalizer; waveform 402 for an MMSE equalizer; and waveform 404 for an MMSE equalizer assuming 20 dB SNR. Packet error rates are computed for SNR's of 14 through 17 dB. Note that the assumed SNR of 20 dB contains a high side error from 3 to 6 dB. By way of example, for a 36 Mbps data rate and a 2×2 MIMO system, the receiver having a Zero Forcing equalizer requires an additional 2 dB over the receiver with the MMSE equalizer using perfect knowledge of SNR in order to achieve a 10% PER (compare waveform 400 with waveform 404). In waveform 402, 20 dB SNR is assumed for each point plotted regardless of the actual SNR. Note that the 20 dB was selected because it safely under-estimates the noise power (over estimates the SNR) that may be present in a 2×2 MIMO link that successfully communicates with this Modulation and Coding Scheme (MCS) of rate ¾ QPSK. As shown, the receiver with the MMSE equalizer that assumes 20 dB of SNR outperforms the receiver with the Zero Forcing equalizer by about 1.25 dB.

Figure 5:
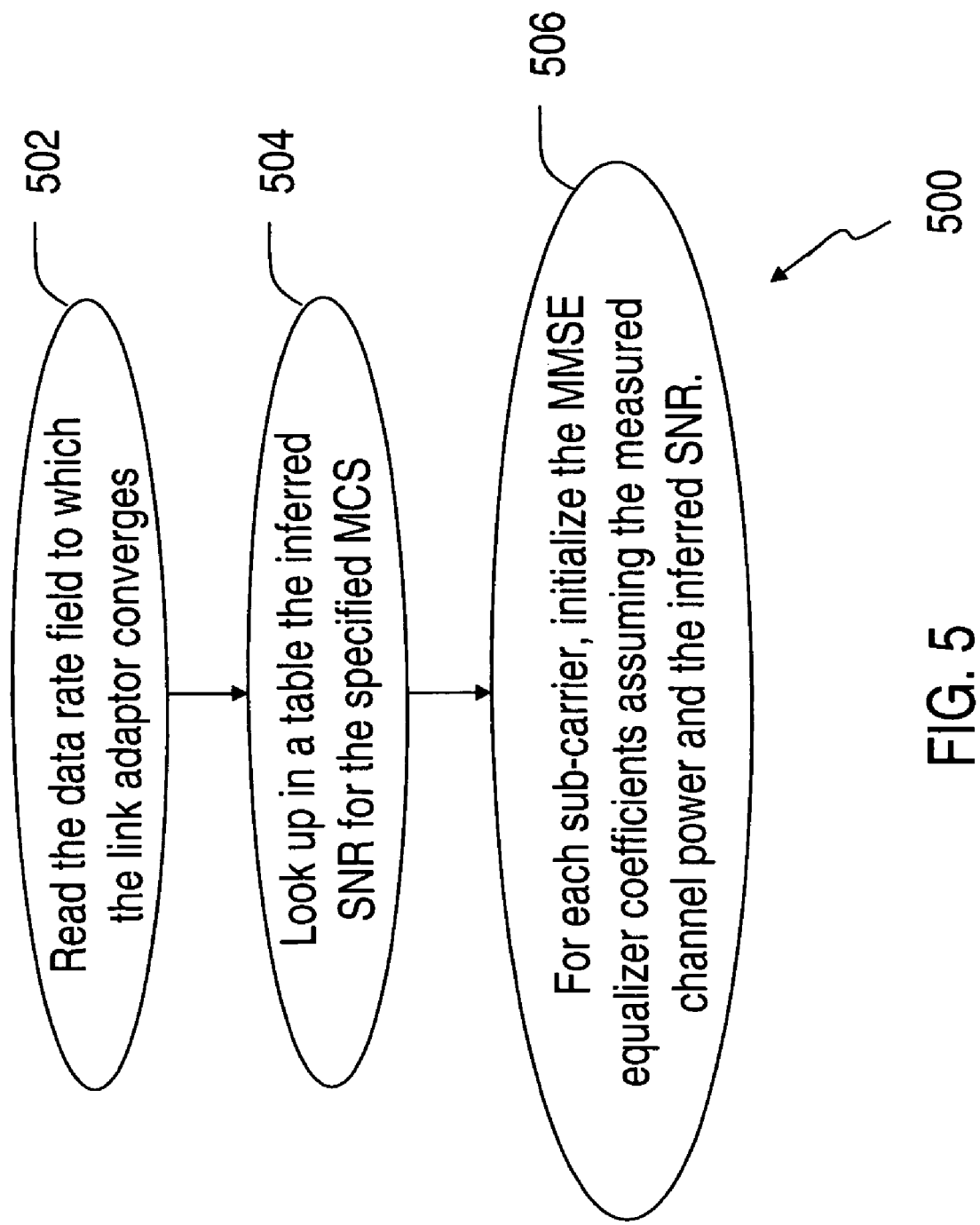
FIG. 5 shows a flowchart in accordance with various embodiments of the present invention.

FIG. 5 shows a flowchart in accordance with various embodiments of the present invention. In some embodiments, method 500 may be used in a wireless device that operates in a MIMO system, an OFDM system or a non-OFDM system. In some embodiments, method 500, or a portion thereof, may be performed by any wireless communication device having a processor, transceiver, link adaptor and MMSE equalizer. Method 500 is not limited by the particular type of apparatus or software element performing the method. The various actions in method 500 may be performed in the order presented, or may be performed in a different order. Further, in some embodiments some actions listed in FIG. 5 may be omitted from method 500.

In operation and as shown in method 500, the link adaptation system for a packet-based network dynamically converges to a data rate at 502. In accordance with this data rate, at 504 a look-up table may be used to provide an SNR range within which the wireless communication device operates. For each sub-carrier, the SNR range may be used (especially the upper end of the range) to generate and initialize the MMSE equalizer coefficients using the SNR value in equation (2) for the MMSE equalizer calculations (at 506).

Thus, an estimate of the SNR as derived from the link adaptation system for each sub-carrier may be used to properly initialize the coefficients of the equalizer. The link adaptation system provides substantially accurate noise estimates without additional complexity added to the receiver. The present invention exploits the relationship between noise estimation error and performance to initialize MMSE equalizer coefficients. Using the inventive algorithm, MMSE equalizer coefficients may be estimated without performing noise estimation and the receiver with this MMSE equalizer may reliably out-perform a Zero Forcing equalizer.

By now it should be apparent that the present invention may reduce the complexity of the receiver acquisition process without adversely impacting the data flow complexity. MMSE equalizers include noise/SNR estimations for coefficient calculations unless they use an algorithm that slowly converges (LMS or RLS as examples) to the ideal coefficients. In the present invention that applies to MMSE equalizers, a noise power (SNR) that is deemed reasonable for successful transmissions may be determined using the link adaptor, which results in a performance better than that which would be achieved by a receiver with a Zero Forcing equalizer. The performance gap between the MMSE equalizer and the Zero Forcing equalizer may be significant at lower MCS's.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method to improve packet error rates in a device, comprising:
   converging a link adaptor to a data rate;
   initializing coefficients for a Minimum Mean Square Error equalizer using soft bit metrics calculated without using noise estimations;
   relating the data rate to a SNR range within which the device is operating;
   selecting an upper end of the SNR range, without using noise estimations, as the SNR value to generate MMSE equalizer coefficients; and
   using the SNR value within the upper end of the SNR range in the MMSE equalizer calculations without using noise estimations to determine the SNR value.

2. The method of claim 1, further comprising:
   using a look-up table to convert the data rate to the SNR range.

3. The method of claim 1, further comprising:
   operating the device in a single input, a single output and non-Orthogonal Frequency Division Multiplexing (OFDM) or Discrete Multi-Tone (DMT) signaling techniques.

4. The method of claim 1, further comprising:
   operating the device using Multiple-Input-Multiple-Output (MIMO).

5. The method of claim 1, further comprising:
   operating the device using Orthogonal Frequency Division Multiplexing (OFDM) and Multiple-Input-Multiple-Output (MIMO).

6. A method of using a Minimum Mean Square Error (MMSE) equalizer in wireless communication device, comprising:
   receiving packet data at an antenna;
   initializing coefficients for the MMSE equalizer using soft bit metrics calculated without using noise estimations;
   using the packet data to gain knowledge of a data rate;
   converting the data rate to a Signal-to-Noise Ratio (SNR) range;
   selecting an upper end of the SNR range, without using noise estimations, as the SNR value to generate MMSE equalizer coefficients; and using the SNR value within the upper end of the SNR range in MMSE equalizer calculations without using noise estimations to determine the SNR value.

7. The method of claim 6 wherein receiving packet data at an antenna further comprises:
   operating the wireless communication device with only one antenna that receives a single modulated carrier.

8. The method of claim 6, further comprising:
   receiving packet data where different data rates are received on different spatial channels.

9. The method of claim 8, further comprising:
   using a look-up table to convert the different data rates to corresponding SNR ranges.

* * * * *

UNITED STATES PATENT AND TRADEMARK OFFICE
CERTIFICATE OF CORRECTION

PATENT NO. : 7,583,608 B2  Page 1 of 1
APPLICATION NO. : 10/977004
DATED : September 1, 2009
INVENTOR(S) : William Chimitt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 569 days.

Signed and Sealed this

Fourteenth Day of September, 2010

David J. Kappos
*Director of the United States Patent and Trademark Office*